(12) United States Patent
Handels et al.

(10) Patent No.: US 6,342,273 B1
(45) Date of Patent: Jan. 29, 2002

(54) PROCESS FOR COATING A SUBSTRATE WITH A POWDER PAINT COMPOSITION

(75) Inventors: Johannes W. H. Handels, Echt; Paulus A. M. Steeman, Geleen, both of (NL); Detlef Schulze-Hagenest, Molfsee; Burkard Huber, Kirchheim, both of (DE); Tosko A. Misev, Naperville (NL); Jorg Buchweitz, Lohhof-Unterschleissheim (DE)

(73) Assignees: DSM N.V., Heerlen (NL); Michael Huber Munchen GmbH, Kirchheim (DE)

( * ) Notice: Subject to any disclaimer, the term of this patent is extended or adjusted under 35 U.S.C. 154(b) by 0 days.

(21) Appl. No.: 09/513,824

(22) Filed: Feb. 25, 2000

Related U.S. Application Data

(63) Continuation-in-part of application No. 08/856,585, filed on May 15, 1997, now abandoned, which is a continuation of application No. PCT/NL95/00390, filed on Nov. 15, 1995, which is a continuation-in-part of application No. 09/160,544, filed on Sep. 25, 1998, now abandoned, which is a continuation of application No. PCT/NL97/00149, filed on Mar. 24, 1997.

(51) Int. Cl.$^7$ .............................. B05D 1/06; B05D 1/28
(52) U.S. Cl. ...................... 427/475; 427/485; 427/521; 427/598
(58) Field of Search ................................ 427/195, 197, 427/475, 485, 521, 598

(56) References Cited

U.S. PATENT DOCUMENTS

| | | | |
|---|---|---|---|
| 2,297,691 A | | 10/1942 | Carlson |
| 2,725,304 A | | 11/1955 | Landrigan et al. |
| 2,990,278 A | * | 6/1961 | Carlson |
| 3,062,109 A | | 11/1962 | Mayo et al. |
| 3,296,965 A | | 1/1967 | Reif et al. |
| 3,374,769 A | | 3/1968 | Carlson |
| 3,862,848 A | | 1/1975 | Marley |
| 3,893,761 A | | 7/1975 | Buchan et al. |
| 3,951,060 A | | 4/1976 | Crystal |
| 3,957,367 A | | 5/1976 | Goel et al. |
| 4,026,648 A | | 5/1977 | Takahashi |
| 4,076,857 A | | 2/1978 | Kasper et al. |
| 4,131,081 A | | 12/1978 | Terashima |
| 4,147,127 A | | 4/1979 | Terashima |
| 4,430,412 A | | 2/1984 | Miwa et al. |
| 4,460,266 A | | 7/1984 | Kopp et al. |
| 4,543,312 A | | 9/1985 | Murakawa et al. |
| 4,614,165 A | | 9/1986 | Folkins et al. |
| 4,640,880 A | | 2/1987 | Kawanishi et al. |
| 4,752,528 A | | 6/1988 | Oka et al. |
| 4,803,143 A | | 2/1989 | Ostertag et al. |
| 4,908,225 A | | 3/1990 | Niimura et al. |
| 4,925,762 A | | 5/1990 | Ostertag et al. |
| 4,946,755 A | * | 8/1990 | Inoue |
| 4,960,666 A | | 10/1990 | Weagley et al. |
| 5,009,979 A | * | 4/1991 | Buxton et al. |
| 5,039,587 A | | 8/1991 | Czech et al. |
| 5,073,579 A | | 12/1991 | Malcholdt et al. |
| 5,124,387 A | | 6/1992 | Binda et al. |
| 5,153,301 A | * | 10/1992 | Tajiri et al. |
| 5,187,038 A | | 2/1993 | Gitzel et al. |
| 5,204,387 A | | 4/1993 | Matsuzaki et al. |
| 5,211,606 A | | 5/1993 | Simon |
| 5,243,392 A | | 9/1993 | Berkes et al. |
| 5,282,006 A | | 1/1994 | Fletcher |
| 5,319,002 A | | 6/1994 | Matsuzaki et al. |
| 5,323,185 A | | 6/1994 | Nagato et al. |
| 5,342,723 A | | 8/1994 | Macholdt et al. |
| 5,355,794 A | | 10/1994 | Freudenheim |
| 5,516,613 A | | 5/1996 | Asanae et al. |

FOREIGN PATENT DOCUMENTS

| | | |
|---|---|---|
| DE | 41 14 209 | 5/1991 |
| EP | 260 638 | 3/1988 |
| EP | 332 223 | 9/1989 |
| EP | 0 445 556 | 9/1991 |
| EP | 476 647 | 3/1992 |
| EP | 493 076 | 7/1992 |
| EP | 505 803 | 9/1992 |
| EP | 354 530 | 1/1994 |
| EP | 600 546 | 6/1994 |
| EP | 636 669 | 7/1994 |
| EP | 636 669 A2 * | 1/1995 |
| EP | 667 381 | 8/1995 |
| GB | 2055 619 | 3/1981 |
| GB | 2056 885 | 3/1981 |
| GB | 2 097 701 A * | 4/1981 |
| GB | 2097 701 | 11/1982 |
| JP | 47-21712 | 6/1972 |
| JP | 01 210 472 | 8/1989 |
| WO | WO 89/10346 | 11/1989 |

OTHER PUBLICATIONS

Simmons, "Coil Coatings—strategies in change", Polymers Paint Colour Journal, 1993, vol. 183, pp. 372–373.

Gaske, "Coil Coatings", Federation Series for Coatings Technol., Feb. 1987, pp. 7–20.

(List continued on next page.)

*Primary Examiner*—Fred J. Parker
(74) *Attorney, Agent, or Firm*—Pillsbury Winthrop LLP

(57) ABSTRACT

The invention relates to a process for coating a substrate with a powder paint composition.

The powder paint particles are first charged by friction or induction in the presence of magnetic or nonmagnetic particles, are next transported and are then applied to the substrate or applied to a transfer medium and subsequently transferred to the substrate, by means of an electric field between the substrate respectively the transfer medium and the means of transport whereafter the ponder paint composition is cured or fused to obtain a powder coating.

43 Claims, No Drawings

OTHER PUBLICATIONS

Schein, "Electrophotography and Development Physics", Springer Series in Electronoics and Photonics, 1992, vol. 14, p. 1.

Hughes, "Particle charging for powder coatings", Powder Coatings, 1986, pp. 10–13.

Reif, "An Electrostatic Process for Applying Dry Coatings on Paper", Tappi, Oct. 1955, pp. 607–609.

Shimada, "Dynamic Properties of Carrier Mixture . . . ", *Proceedings of IS & T's $7^{th}$ Intl. Congress on Advances in Non–impact Printing*, vol. I, pp. 259–265 (1991).

Huijben, "Océ's Unique Copier . . . ", *Proceedings of IS & T's $7^{th}$ Intl. Congress on Advances in Non–impact Printing*, vol. II, pp. 453–462 (1991).

* cited by examiner

PROCESS FOR COATING A SUBSTRATE WITH A POWDER PAINT COMPOSITION

CROSS-REFERENCE TO RELATED APPLICATIONS

This application is a continuation-in-part of U.S. application Ser. No. 08/856,585, filed May 15, 1997, now abandoned which is a continuation of International Application PCT/NL95/00390, filed Nov. 15, 1995, and this application is a continuation-in-part of U.S. Application Ser. No. 09/160,544, filed Sep. 25, 1998, now abandoned which is a continuation of International Application PCT/NL97/00149, filed Mar. 24, 1997. All these four disclosures are hereby incorporated by reference.

FIELD OF THE INVENTION

The invention relates to a process for coating a substrate with a powder paint composition.

BACKGROUND OF THE INVENTION

In the powder paint industry, powder pats are usually electrically charged by means of a corona discharge or tribocharging. Then the powder paint is electrostatically applied to the object to be coated. In general, the electrostatic spraying technique involves use of corona and/or tribo charging guns as described in, for example, Misev "Powder Coatings Chemistry and Technology", pages 324–344, John Wiley, 1991.

In industrial applications varnishing of, for example, cellulose based sheets and webs is usually carried out using solvent or water-based varnishes. The solvent-based varnishes have as a disadvantage the evaporation of solvents into the atmosphere. Because of environmental reasons emission of solvents has to be reduced drastically. The water-based varnishes have as a disadvantage that they need much energy for drying. To achieve the highest possible gloss the use of calendars is suitable. This separate step is costly and limits the process speed.

Alternatively, liquid UV-curable varnishes are used to overcome these difficulties. However, this group of materials is often rejected because of their sensibilizing and irritating character due to the applied monomers, which are the main components of these coating liquids. Another disadvantage of this coating technology can be that the smell makes the coating unsuitable for food packaging.

GB-A-2056885 discloses a process for coating a cellulose fiber substrate like cardboard with a powder paint composition and curing by radiant heat. Generally, a binder system for a powder paint composition consists of a resin and a crosslinked. A disadvantage of the process according to GB-A-2056885 is the limited capacity of the applied powder paint spray guns which imposes a restriction on the rate of application of powder paint to the substrate. Another disadvantage is that it is very difficult to achieve coatings having a layer thickness below 15 μm.

A further disadvantage is the major thermal load imposed on the heat-sensitive substrate during curing of the powder paint composition.

Powder paints are also being considered for use in the coil coating industry. Coil coating is a special application method in which coiled metal strips are unwound and then passed through pretreating, coating, and drying equipment before finally being rewound. Coil coating allows for very efficient coating of large surface areas in a short time at high throughput. However, the inherent limitation in powder paint spray gun capacity imposes restrictions on the rate of application of powder paints to the coil and on the reliability of the coil coating process. Hence, there is a strong need in this industry for a high speed but yet reliable continuous process for the application of powder coatings.

This appears, for example, from "Coil Coatings Strategies in change" by G. C. Simmons Polymers Paint Colour Journal, Jul. 28, 1993, page 373.

An object of the present invention is to provide an improved process for coating a powder paint on a substrate, at rapid rates (e.g. 100 metres of substrate/minute) while yielding a high quality coating.

The process must also offer the possibility to treat large surface areas simultaneously.

SUMMARY OF THE INVENTION

The invention is characterized in that powder paint particles are first charged by friction or induction in the presence of magnetic or non-magnetic particles, are next transported and then applied to the substrate, or applied to a transfer medium and subsequently transferred to the substrate, by means of an electric field between the substrate respectively the transfer medium and the means of transport, whereafter the powder paint composition is cured or fused into a powder coating and wherein the substrate is, for instance, metal, textile, plastic wood, board, or paper-like. The powder coating adheres to the substrate.

If a transfer medium is used, the powder paint particles are first applied to the transfer medium by means of an electric field, transported to the substrate by the transfer medium and then applied to the substrate by, for example, electrical, electrostatic or mechanical forces. Thermal processes can also be used in this application step.

The present process allows powder paint particles to be applied to substrates at rates up to, for instance, 200 meters of substrate/minute with film thicknesses of the cured film of between for example, 3 and 200 μm. Moreover, this process satisfies the need to eliminate multiple spray guns in a coil coating process.

The present process allows powder paint particles to be applied to coated or uncoated board- or paper-like substrates such as, for example, cardboard, hardboard, fiber board for example MDF, particle board, chipboard, plywood, veneer, block board (which board products can be paperfaced), wood, timber and paper at rates up to, for instance, 400 meters of substrate/minute with a film thickness of the cured film of between, for example 1 μm and 100 μm.

The process according to the invention results in a substantially (e.g. more than 90%) fully coated substrate. In contrast, in, for example, a printing process the coverage is, for example, only 10% of the substrate.

The charging of the powder paint particles by friction or induction, the transporting or conveying and the application to substrates can be effected using processes commonly known in photocopying technology or laser printer technology (which processes are elucidated in, for example, L. B. Schein, Electrography and, Development Physics, pages 32–244, Volume 14, Springer Series in Electrophysics 1988: the disclosure of which is incorporated herein by reference).

DESCRIPTION OF PREFERRED EMBODIMENTS

According to a preferred embodiment of the invention the powder paint particles are mixed with magnetic or non-magnetic carrier particles to obtain friction charging whereupon the mixture is transported and the powder paint particles are applied to the substrate by means of an electric field between the substrate and the means of transport.

The powder paint particles may be based on solid particles of a radiation curable binder system.

Suitable radiation curable binder systems include for example a polymer having unsaturated groups and a cationic curable system based on, for example epoxy resins.

Preferably, the radiation curable binder system comprises a polymer having unsaturated groups.

Preferably, said polymer having unsaturated groups has a degree of unsaturation between about 200 and about 1800 grams of polymer per mole of unsaturated group.

Depending on the conductivity of the substrate the electric field between the substrate and the transfer medium or means of transport can be applied with suitable methods like for instance a corona discharge or a moving or fixed counterelectrode (see for instance Schein, pp. 36–37 and 47).

Preferably, the polymer having unsaturated groups has a molecular weight (Mn) between about 800 and about 6800 grams/mole and a viscosity between 1 dpas and 800 dPas (measured with an Emila rheometer at 165° C.)

Preferred polymers are unsaturated polyesters, unsaturated polyacrylates and acrylated polyesters.

Preferably, the unsaturated polymer has a degree of unsaturation between 300 and 1800 grams per mole of unsaturated group (WPU), a molecular weight (Mn) between about 800 and about 6800 and a viscosity between 1 dpas and 400 dpas.

The preferred degree of unsaturation for an unsaturated polyester is between 500 and 1500 grams per mole of unsaturated group.

The molecular weight (Mn) is preferably between about 2500 and about 4500 grams/mole. 30 The unsaturated polyester can be (semi)crystalline or amorphous.

In general, the glass transition temperature (Tg) of the amorphous resin is higher than 40° C. Semicrystalline resins have a Tg and a melting point (Tm), and Tg is lower than Tm.

The melting point of the (semi)crystalline unsaturated polyester is between about 40° C. and about 180° C., and preferably, is between about 60° C. and about 140° C. The melting point and the melting range are discussed at pages 36, 286 and 295 of Misev, Powder Coatings, Chemistry and Technology Wiley 1991, the disclosure of which is incorporated herein by reference.

Thermosetting powder coatings that are based on unsaturated polyester are described in Misev, Powder Coatings, Chemistry and Technology, at pages 167–170, the disclosure of which is incorporated herein by reference.

Preparation of the unsaturated polyester can be carried out in a single-step process in which unsaturated polyfinctional carboxylic acids and glycols are heated to a temperature, for example, between about 180° C. to about 230° C. for between about 6 hours to about 15 hours.

Preparation of the unsaturated polyester can also be carried out in a two-step process in which saturated glycols and saturated polyfunctional carboxylic acids are esterified in a first step at, for example, between about 230° C. to about 250° C. for between about 2 hours to about 8 hours. In a second step, saturated or unsaturated glycols and acids, or mixtures thereof, are esterified at, for example between about 180° C. and 220° C. for between about 2 to about 8 hours.

In general, the unsaturated polyester is obtainable from the condensation of one or more aliphatic or cycloaliphatic mono-, di- or polyfunctional alcohols, or mixtures thereof, one or more aliphatic, cycloaliphatic, or aromatic di- or polyfunctional carboxylic acids, or mixtures thereof, and if desired, a monofimctional carboxylic acid or the corresponding ester of this monofunctional carboxylic acid.

Examples of suitable alcohols and glycols include, among others, benzyl alcohol, ethylene glycol, propylene glycol, neopentylglycol, butanediol, hexanediol, dimethylol cyclohexane, diethylene glycol, glycerol, trimethylol propane, pentaerytritol, dipentaerythritol, or mixtures thereof. Instead of an alcohol or glycol, or together with an alcohol or glycol, one or more epoxy compounds such as, for example, ethylene oxide, propylene oxide, allyl glycidyl ether, or mixtures thereof, can be used.

Examples of suitable di- or polyflimctional carboxylic acids include maleic acid, fumaric acid, itaconic acid, citraconic acid, malonic acid, succinic acid, glutaric acid, adipic acid, sebacic acid, 1,4 cyclohexane dicarboxylic acid, hexahydrophthalic acid, hexachloroendomethylenetetrahydrophthalic acid, dichlorophthalic acid, isophthalic acid, terephthalic acid, trimellitic acid, or mixtures thereof.

Fumaric acid, maleic acid, or a mixture thereof, is preferred. The carboxylic acids can also be applied in the corresponding anhydride form, so.that, for example, tetrahydrophthalic anhydride, maleicanhydride, phthalic anhydride, or mixtures thereof can be used.

If desired, the unsaturated polyester can also be obtained from saturated or unsaturated monofunctional carboxylic acids, or mixtures thereof These monofunctional carboxylic acids include, for example, synthetic or natural fatty acids having 2 to 36 carbon atoms. Corresponding esters of monofunctional alcohols such as glycerol are used for esterification. Examples of suitable monofinctional carboxylic acids include, among others, lauric, stearic, oleic, linoleic, benzoic, acrylic, methacrylic acid, or mixtures thereof. The unsaturated polyester can also contain dicyclopentadiene. If the unsaturated polyester is hydroxyl functionalized, then the hydroxyl number of the polyester is usually between about 18 mg KOH/gram of resin and about 75 mg KOH/gram of resin.

If the unsaturated polyester is acid functionalized, the acid number is usually between about 18 mg KOH/gram of resin and about 75 mg KOH/igram of resin.

Suitable acrylate polymers include, for instance, acrylate polymers having several side chains containing unsaturated groups.

These polymers can be obtained by means of a two-step process. In the first step an acrylate polymer is prepared by a conventional polymerization process, in which also a certain proportion of functional monomer is copolymerized to obtain a functionalized acrylate polymer. This functional monomer, which usually is present in amounts of between 3 and 60 wt. %, can be, for example, an epoxy functionalized monomer such as glycidyl (meth)acrylate; an acid functionalized monomer such as, for instance, (meth)acrylic acid, a hydroxy functionalized monomer such as, for instance hydroxyethyl (meth)acrylate; or an isocyanate functionalized monomer such as, for instance. TMI (metaisopropenyl-α-α-imethylbenzyl isocyanate).

In the second step for the acrylate synthesis, an addition reaction, is carried out between the functional groups of the acrylate polymer which is prepared in the first step and a compound having both a functional group capable of reacting with the functional groups and also an unsaturated group in the side chain.

For the addition reaction of this second step, the functionalized acrylate resin can be dissolved in a solvent such as for example toluene, xylene and/or butyl acetate. The compound having the unsaturated group, is added at temperatures between, for example, 50° C. and 150° C. and next, stirring takes place for some hours. Progress of the reaction can be monitored by means of titrations of, for instance, acid groups or isocyanate groups. Addition reactions of this second step are, for instance, between a compound having an acid group and an epoxy functional acrylate polymer, a compound having a hydroxyl group and an isocyanate functionalized acrylate polymer, a compound having an isocyanate group and a hydroxyl functionalized acrylate polymer, a compound having an anhydride group and a hydroxyl functionalized acrylate polymer or a compound having an epoxy group and an acid functionalized acrylate polymer.

It is preferred to allow an epoxy functionalized acrylate polymer to react with (meth)acrylic acid.

The unsaturated side chain can have, for example, methacrylate ester, allyl, vinyl, vinyl ether, or anhydride groups, or mixtures thereof. Suitable compounds that are allowed to react with the functionalized acrylate copolymer are, for example, methacrylic acid, glycidyl methacrylate, TMI, allylglycidyl ether, hydroxybutylvinyl ether, maleic anhydride, or mixtures thereof.

The unsaturated acrylate polymer can also be obtained by means of a multi-step process. For example, one of the isocyanate groups of a diisocyanate compound such as, for example, isophorone diisocyanate (IPDI), hexamethylene diisobyanate (HDI) methylene-biscyclohexylisocyanate (hydrogenated MDI) is allowed to react with a methacrylate monomer having the hydroxyl functionality. The resulting urethane compound, which contains isocyanate and methacrylate groups for further reaction, can subsequently be allowed to react with, for example, an acrylate copolymer having the hydroxyl functionality. This acrylate copolymer can be prepared using, for example, hydroxyethyl methacrylate as a functionalized monomer.

Depending on the binder system a crosslinker has to be applied or can optionally be applied.

A preferred crosslinking agent for the radiation curable binder composition according to the present invention is an oligomer or polymer having one or more vinyl ether, allyl, vinyl ester, or (meth)acrylate groups. More preferably an oligomer or polymer having at least two vinylether groups is applied.

The crosslinking agent having vinyl ether groups is preferably made of a divinyl ether functionalized urethane based on, for example, a diisocyanate and hydroxybutyl or hydroxyethyl vinyl ether.

Suitable crosslinking agent having (meth)acrylic groups include for example dimethacrylate functionalized urethane based on, for example, a diisocyanate and hydroxyethyl methacrylate or polymethacrylate functionalised urethanes.

Suitable difunctional isocyanates used in the preparation of the crosslinking agent include isophorone diisocyanate, or methylene diisocyanate, or methylenebiscyclohexylisocyanate. Functionalized oligomers derived from these diisocyanates such as isocyanurates, uretdiones, and biurets can, for example, also be used.

Preparation of vinyl ether functionalized diurethanes can be carried out by means of the process described in, for example, EP-A-505.803, the complete disclosure of which is incorporated herein by reference Preparation of suitable vinyl ether terminated ester oligomers for use as crosslinking agent is described in WO-A-89/10.346, the complete disclosure of which is incorporated herein by reference. A suitable vinyl ester functional compound is, for example, divinyl adipate.

The crosslinking agent preferably contains between about 1 to 10 vinyl groups, and more preferably, contains at least two vinyl groups per molecule.

The crosslinking agent can be a liquid or a solid. Solid crosslinking agents are preferred because good powder stability is more easily achieved, after combination of the crosslinking agent with the unsaturated polymer.

The crosslinker having allyl groups can for example have 2–12 allyl groups. The crosslinker can have allylether groups and further ester or urethane groups. The crosslinker can also have vinylether and allylether groups. It is also possible to use vinylether and allylether containing crosslinkers.

Very suitable crosslinkers include, for example, the ester of trimethylolpropane diallyl ether or pentaerythritol triallyl ether and a polycarboxylic acid (anhydride). Also oligomers containing allyl groups, for example, allyl alcohol, trimethylolpropane diallyl ether, allyl glycidyl ethers and pentaerythritol triallyl ether. Examples of suitable isocyanates are isophorone diisocyanate, toluene diisocyanate, hexamethylene diisocyanate and methylene biscyclohexylisocyanate.

The relative amounts of polymer having unsaturated groups and crosslinking agent in the binder composition depend in part on the choice of crosslinking agent. In general, if the crosslinking agent is vinyl ether functionalized, the equivalent ratio of polymer unsaturation to crosslinking agent unsaturation is between 1:2 and about 2:1, and preferably, about 1:1. In general, if the crosslinking agent is a methacrylate or a vinyl ester functionalized compound, the equivalent ratio of polymer unsaturation to crosslinking agent unsaturation is between about 1:2 and about 2:1, and preferably, about 1:1.3.

A suitable cationic curable system based on epoxy resins is disclosed in EP-A-667381.

Radiation curing is preferably carried out via ultraviolet (UV) or electron beam (EB) curing. These techniques are described in, for example, the article, "UV and EB-curing", by S. J. Bett et al. in Jocca 1990 (11), pgs. 446–453, the complete disclosure of which is incorporated herein by reference. Most preferably UV-curing is applied. Very suitable UV-lamps for curing thin layers or to obtain high speeds are excimer lamps (as described for example at pages 48–52 of the Conference Proceedings of RAD TECH Europe Sep. 25, 1995, in Maastricht).

For UV-radiation curing of the powder paint formulation a photoinitiator is mixed with the binder composition at a temperature between, for example, about 50° C. and about 150° C. Mixing can take place in a solvent or in the melt with use of an extruder, wherein the latter is preferred. Pigments, flow promotors, other additives, or mixtures thereof, can also be used.

Another advantage of the present invention is the fast cure at lower temperatures, in comparison with the prior art processes related to thermocuring systems, resulting in a lower thermal load on the substrate which is very relevant for the present substrates.

An important advantage of the radiation curing according to the present invention is that flow of the powder paint on exposure to heat is fully separated from the curing reaction on exposure to UV or electron beam radiation, which enables powder coatings to be made that exhibit excellent flow.

Common additives such as, for example, pigments, fillers, flow promoters, tribo additives, stabilizers, or mixtures thereof can be added to the binder system. Suitable pigments include, for example, inorganic pigments such as titanium dioxide, zinc sulphide or iron and chromium oxide, and organic pigments such as, for example, azo compounds.

Suitable fillers include, for example, metal oxides, silicates, carbonates, sulfates, or mixtures thereof, as known to those skilled in the art.

Upon curing or fusing of a powder paint composition a powder coating is obtained.

The powder paint composition may comprise any one of the known binder systems such as, for example, described by Misev, "Powder Coatings, Chemistry and Technology" (John Wiley and Sons, 1991), pages 9–171, the disclosure of which is incorporated herein by reference.

The powder paint composition can be tribomodified, as described in, for example, U.S. Pat. No. 5,124,387, the complete disclosure of which is incorporated herein by reference.

The powder paint composition can, if desired, comprise usual additives such as fillers, pigments, antioxidants, stabilizers, flow agents, catalysts and triboadditives as described in, for instance, U.S. Pat. No. 5,342,723. The powder paint composition can also, for example, comprise additives for flow control purposes or for charge control purposes as described, for instance, in U.S. Pat. No. 4,960,666.

The powder paint compositions can, for example, be prepared and characterized as described in, for example, the aforementioned Misev on pages 224–283 which disclosure is incorporated herein by reference. The selection of grinding, classifying and sieving equipment is important for obtaining the desired particle size of the powder paint particles. For this purpose target mills, fluidised bed mills, static classifiers and rotating classifiers may be used.

The binder system can be a thermosetting or a thermoplastic system. Preferably, the binder system for the powder paint is a thermosetting binder system.

Various types of curing reactions can be employed in thermosetting powder coatings for instance as disclosed in the afore mentioned Misev and radical curing systems such as UV-curing systems and electron beam curing systems. In many cases the thermosetting powder paint compositions comprise a binder system consisting of a resin and a crosslinker. Suitable resins include, for example, polyester resins, acrylic resins and alkyd resins.

Examples of suitable binders are: saturated carboxylated polyester resin/triglycidylisocyanurate (TGIC), saturated carboxylated polyester resin/epoxy resin, saturated carboxylated polyester resin/crosslinker containing hydroxylamide group, saturated carboxylated polyester resin aliphatic oxirane, saturated hydroxylated polyester resin/isocyanate, polyester resin/diglycidyl phtalate containing crosslinker, saturated hydroxylated polyester resin/hexamethoxymethylmelamine (HMMM), saturated hydroxylated polyester/glycoluril(derivative), saturated hydroxylated polyester/benzoguanamine (derivative), saturated hydroxylated polyester resin/amino resin, saturated hydroxylated polyester resin/phenolic resin, epoxy resin/amino resin, epoxy resm/phenolic resin, epoxy resin/anhydride, epoxy resin (selfcrosslinking), phenolic resin (selfcrosslinking), epoxy ester resin/amino resin, amino resin/isocyanate, acrylamide resin (selfcrosslinking), acrylic resin/hydroxyfunctional compound, unsaturated acrylic resin (selfcrosslinking), unsaturated acrylic resin/vinylether, unsaturated polyester resin/vinylether and saturated epoxidized acrylic resin/dodecanedicarboxylic acid.

Preferred binder systems include a carboxylated polyester as resin and TGIC, an epoxy resin, a hydroxylamide group containing crosslinker (for example PRIMID™) or an aliphatic oxirane (as disclosed in EPA-600546) as crosslinker.

Other preferred binder systems include hydroxylated polyester resin with HMMM or an isocyanate group containing crosslinker, an epoxy resin with a phenolic resin crosslinker and an epoxy ester resin with an amino resin crosslinker.

Upon curing or fusing of a powder paint composition a powder coating is obtained.

The median particle size (by volume) of the powder paint particles $X_{50,3}$ (as defined according to the description and notation at pages 12–14 of Mechanische Verfahrenstechnik by Prof. Rumpf (Carl Hansen Verlag, 1975)) can be for example below about 200 μm, and preferably, is between about 5 and about 60 μm.

The selection of the particle size depends on for example the desired final coating thickness for a given application.

The particle size distribution can be as broad as it is in conventional powder paint technology.

Preferably, the particle size distribution is relatively narrow. More preferably, the ratio $X_{75,3}:X_{25,3}<3$ (according to the definition in the aforementioned Rumpf), since the efficiency of the development step may vary with the particle size.

It is one of the advantages of the process according to the present invention, that it is possible to apply particles having median particle sizes between about 5–30 μm. It is very difficult to apply these particles with conventional spray guns.

Carrier particles can be either magnetic or non-magnetic. Preferably, the carrier particles are magnetic particles.

Suitable magnetic carrier particles have a core of, for example, iron, steel, nickel, magnetite, γ-$Fe_2O_3$, or certain ferrites such as for example CuZn, NiZn, MnZn and barium ferrites. These particles can be of various shapes, for example, irregular or regular shape.

Generally, these carrier particles have a median particle size between 20 and 700 μm. Preferably, the carrier particle size distribution is narrow and more preferably the ratio $X_{75,3}:X_{25,3}<2$.

Exemplary non-magnetic carrier particles include glass, non-magnetic metal, polymer and ceramic material.

Non-magnetic and magnetic carrier particles can have similar particle size.

Preferably the carrier core particles are coated or surface treated with diverse organic or inorganic materials to obtain, for example, desirable electrical, triboelectrical and/or mechanical properties. Inorganic materials are described in for example U.S. Pat. No. 4,925,762 and U.S. Pat. No. 5,039,587. Organic coating materials include, for example, polymers having fluor-, silicone-, acrylic-, styrene-acrylic, melamine- or urethane-group. Mixtures of these polymers can also be used. Preferably a fluor containing polymer is used as coating.

For coating the carrier particles, any suitable method to coat a thin or thick layer on a powder surface, such as, for example spray coating in a fluidized bed or dry coating an rotary kiln, can be used.

The carrier coatings can comprise suitable fillers or additives to control for example, triboelectrical, electrical or mechanical properties of the carrier coating. For example conductive materials such as, for example, carbon black and metal powder or charge controlling material and flow improving materials can be used.

The carrier particles may be conductive (as described in for example U.S. Pat. No. 4,076,857) or non-conductive.

For direct application without a transfer medium, on a metal substrate, the carrier particles should be preferably non-conductive and they should have a well-defined high resistivity of, for example, $10^9$–$10^{11}$ Ohm at 10V potential and a break-through voltage above 1,000V (measured with a c-meter supplied by Epping GmbH).

In case of use of a transfer medium the carrier particles can be conductive or on-conductive.

Preferably, carriers particles having high voltage break through are used so hat high electric fields can be used between transport means and substrate or transfer media to achieve a thick powder layer.

A developer comprises powder paint particles and carrier particles. A development method is a way of developing and a development unit is a complete system comprising of, for example, a developer roller (transport medium), mixing screw(s), a supply device, blades, detectors and the like. Other examples are described in, for example, GB-A-2097701, U.S. Pat. No. 4,147,127 and U.S. Pat. No. 4,131,081.

In the present invention the development method can be either one-component or two-component. According to a preferred embodiment of the invention the two-component development method, in which the carrier particles are mixed with the powder paint particles, is used. Alternatively, also all kinds of monocomponent development like, for example, magnetic conductive, magnetic insulative or non magnetic development as disclosed on pages 203 ff of the above mentioned Schein or binary developers consisting of e.g. magnetic toner and carrier as described in U.S, Pat. No. 5,516,613 can be used.

Preferably, a combination of powder paint particles having a $X_{50,3}$ below 80 µm and a $X_{95,3}$ below 120 µm and carrier particles having a $X_{50,3}$ below 180 µm and a $X_{95,3}$ below 200 µm is used.

More preferably, a combination of powder paint particles having a $X_{50,3}$ below 30 µm and above 5 µm and a $X_{95,3}$ below 50 µm and carrier particles having a $X_{50,3}$ below 180 µm and above 5 µm and a $X_{95,3}$ below 200 µm is used.

In the two-component developer the amount of powder paint particles can be, for example, between about 1 and about 50 wt. % and preferably between about 5 and about 25 wt. % (relative to the amount of developer). It is an advantage of the process according to the invention that it is possible to use powder paint concentrations well in excess of 10 wt. %. Consequently, the amount of carrier particles can be between about 50 and about 99% by weight (relative to the amount of developer) and preferably is between about 75 wt. % and about 95 wt. %.

The powder paint concentration can be externally or internally (in the evelopment unit) controlled. External control can be effected by measurement of ayer thickness of uncured or cured powder by, for example, optical, photo-thermical or dielectrical means. Internal control car be carried out in the developer station by means of powder paint concentration control by any suitable means like inductive control (see, for example, U.S. Pat. No. 4,147,127 and U.S. Pat. No. 4,131,081) or volume control.

In a two-component development method the powder paint particles are triboelectrically charged by intensive mixing and friction with the carrier particles.

In the process according to the present invention it is also possible to use a one component development method with the carrier particles being incorporated in the powder paint particles as disclosed in, for example, U.S. Pat. No. 4,803,143 and U.S. Pat. No. 4,543,312.

In a one-component development method the particles are charged by induction or friction, depending on the selection of the powder paint particles. Both one- and two-component developers can be transported by magnetic, electric and/or mechanical transport.

Preferably, the means of transport is a conveying method.

The mixture is preferably conveyed by means of a magnetic roller as described in for example U.S. Pat. No. 4,460,266. In addition to a magnetic brush apparatus also useful in the present process are, for example, non-magnetic cascade development (see page 94 of the hereinbefore incorporated reference of L. H. Schein), magnetic cascade development (as described in for example "The 9th International Congress on Advances in Non-Impart Printing Technologies/Japan Hardcopy '93, pages 133–140). In addition also transport by air, for example, powder cloud development can be used. An exemplary process is described in for example U.S. Pat. No. 2,725,304. Also jumping (projection) development (see for example Electrophotography, Fourth International Conference, pages 207–228. Nov. 16–18, 1981) can be carried out.

When two-component developers are used, the parameters which are relevant for the process (such as, for example, powder paint concentration, development potential and machine parameters) can be chosen depending on the application. This may lead to batch developer replacement, e.g. after certain time intervals or if certain parameters are out of a control range. Preferably, continuous developer material replenishment, as described in, for example. U.S. Pat. No. 4,614,165, can be used to avoid process interruption for batch replenishment.

Suitable substrates to be coated include, for instance, metal (such as for example aluminum, steel, electrogalvanised steel and hot dip galvanized steel), textile, plastic and wood. Preferably, the process according to the invention is effected with use of coilcoating substrates. The preferred substrate is metal.

The substrate can have any desired shape such as band or sheet, i.e. continuous or discontinuous.

The substrate may be magnetic or non-magnetic. If a magnetic substrate and a magnetic developer are used, generally an intermediate transfer medium like a belt or a roller has to be placed between the magnetic roller and the substrate as for example disclosed in EP-A-354530.

If a transfer medium is used between the transport means and the substrate any suitable transfer medium like metallic drums, dielectric drums, foil from metals or polymers like silicone rubber belts, as described in "Proceeding of IS&T's Seventh International Congress on Advances in Non Impact Printing Technologies", Vol. 11, page 453–462, or composite materials can be used.

Alternatively a two step transfer may be used in which a layer of powder paint is developed on a first transfer medium and then transferred to a second transfer medium and finally transferred to the substrate.

The present coating process can be advantageously used in the application of varnishes.

The process according to the present invention is preferably used in a coil-coating process or in a sheet-coating process. The coated substrates obtained with this sheet coating process can advantageously be used in the production of cans. Surprisingly, it was found that fully closed layers having a thickness of about 5 µm can easily be obtained with the process according to the invention whereas it is very difficult to obtain such layers with spraying techniques.

The process can also be used in a foil-coating process and furthermore in any process where a constant layer of powder paint has to be applied to a surface.

The pretreatment of substrates is important. Suitable pretreatment processes are described in, for example, "Pretreatment Processes and Materials" 1986 European Coil Coating Directory, pages 134–135.

The substrate can be pretreated or coated with, for instance, a primer. Such a primer may be coated as a thin layer in wet form or by means of the process of the present invention.

Generally, more layers can be applied with or without intermediate fusing eparately on the substrate or separately on the transfer medium and jointly transferred to the substrate.

A preferred process according to the present invention thus comprises charging of the powder paint particles by intensive mixing and friction with magnetic carrier particles, transport of carrier particles and powder paint particles with the aid of a magnetic roller and subsequent application of the powder paint particles to a substrate by means of an electric field between the substrate and the magnetic roller, whereafter the powder paint composition is made to cure or to fuse to a powder coating using techniques known in the art.

In this preferred process it is also possible to apply a transfer medium as described previously.

For melting, the applied powder paint can be transferred into an oven or can be exposed to IR radiation, or a combination of both. Alternatively all other suitable fusing methods e.g. as disclosed on page 47–49 of the above mentioned Schein can be used. The applied powder paint is molten at temperatures between, for example, about 60° C. and about 140° C. to form a continuous, smooth, softened or molten coating with coating thickness between, for example, about 1 µm and about 100 µm. Then, the hot panel is cured with use of a UV light source. Post-heating can also be carried out. The powder coating adheres to the substrate. It is possible to apply the coating on printed substrates produced with common printing techniques (offset, gravure, flexo, digital printing either electrographic or inkjet). The printing process and the coating process can be carried out in two separate steps (off-line) or as well in one production step (on-line).

The coating may cover the full area of the substrate or only part of it (spot coating). In case of spot coating any image creating technology as described in the above mentioned Schein may be used to create an image on a suitable transfer medium or as first transfer medium in case of two step transfer as described before.

The carrier particles may be dosed to a mixing arrangement in which one or more means of intensive mixing such as, for example, worm wheels are present along with a magnetic roller. Suitable mixing arrangements are described in, for example, "Proceeding of IS&T's Seventh International Congress on "Advances in Non Impact Printing Technologies", Vol. 1, pages 259–265, the complete disclosure of which is herein incorporated by reference.

Next, an amount of powder paint particles is fed into the mixing arrangement which is selected so as to obtain a powder paint particles concentration of, for example, about 5–15 wt. % powder paint relative to the amount of carrier particles. In this way, a developer is formed.

During the intensive mixing and friction in the mixing arrangement, due to the action of the worm weels, the carrier particles and the powder paint particles become oppositely (tribo) electrically charged. A layer of electrically charged powder paint particles covers the carrier particles. The carrier particles subsequently act as carrier for the charged powder paint particles. Next, the developer is fed to the magnetic roller, in which a brush-like structure, also known as the magnetic brush, is formed. The magnetic roller transports the brush to the contact area with the substrate or transfer medium. In this way, powder paint particles, as well as carrier particles, become available at the contact area with the substrate or transfer medium. By applying a sufficiently strong electric field between the magnetic roller and the substrate or transfer medium the powder paint particles can be drawn from the brush to the substrate or transfer medium, onto which they adhere electrostatically. In the case a transfer medium is used, the powder paint particles are subsequently transported to the contact area of the transfer medium and the substrate and next transferred to the substrate via one of the aforementioned transfer processes.

Finally, the magnetic brush is scraped off the magnetic roller as it is returned into the mixing bin.

As a result, a layer of powder paint particles forms on the substrate, which layer is substantially free from carrier particles, and can then be cured. Eventually an apparatus which can catch carrier particles can be introduced such as for example a catching equipment for residual carrier, as described in "Proceeding of IS&T Eighth International Congress on Advances in Non Impact Printing Technologies", pages 391–393. The thickness of said layer of powder paint particles can, for example, be controlled via the electric field strength between the magnetic roller and the substrate, or the transfer medium, the magnitude of the charge on the powder paint particles (e.g. by varying the concentration and the mixing time) and the roller speed.

The process according to the invention can advantageously be applied in equipment for small-scale application of overprint varnishes. These machines can be used online or offline in connection with black and white, two colour or full colour copy machines or computer output printers to produce paper or cardboard sheets with high gloss and high resistance e.g. against fingerprints, oil and acids. The process may be used as an alternative to lamination.

The process can also be used in-line or off-line in connection with printing machines of any speed and any technology (for example large scale) like offset, gravure, flexo or digital printing to produce overprint varnishes e.g. for cover sheets of booklets and printed cardboard for packaging.

The process may be used for varnishes, which may be applied below or above a tonerbased image to improve adhesion of the toner to the paper and to improve protection against, for instance, falsification of a document.

The development station with toner hopper and optional the transfer means and the fusing and curing may be designed in a way that it can be easily interchanged, for instance as a cartridge, by any (unskilled) person, for example, for use in a copying machine or laser printer. Consequently, these small scale overprint varnish application machines can be used, for example, in printing shops, copy shops and offices.

The invention will be further described based on the following non-limiting examples.

EXAMPLES

Example I
Production of a Powder Paint Composition

A powder paint was prepared by premixing 558 parts of saturated carboxylated polyester resin, (URALAC P50101, supplied by DSM Resins), 42 parts by weight of triglycidyl-isocyanurate (TGIC ARALDITE PT 810™, supplied by Ciba Geigy Ltd.). 300 parts by weight of titanium dioxide, (KRONOS 2160™, supplied by Kronos Titan GmbH), 9 parts by weight of flow control agent (RESIFLOW PVS™, supplied by Worlee-Chemie GmbH) and 4.5 parts of benzoin in a "Diosna" V-30 batch mixer until the mixture is uniform and next melt kneaded in a Buss-Ko-Kneader PLK 46 case setting temperature 120–130° C.; kneading screw temperature 50°; 60 r.p.m.).

The cooled extrudate was milled first in a hammer mill to a particle size <3 mm and then fed into a fluidized bed mill (Condux CFS8), having a nozzle diameter of 4 mm. The material was milled with 5 bar overpressure air pressure at 1900 r.p.m. of the classifier wheel incorporated in the mill obtaining a powder paint with a median particle size of 24 μm and a ratio $X_{75.3}/X_{25.3}$ ratio of 2.3.

Example II
Preparation of a Carrier 998 parts by weight Cu-Zn-ferrite powder, having a median particle size of 81 μm and a ratio $X_{75,3}/X_{25,3}$ of 1,32 (both measured with the laser granulometer Cilas HR 850), were dry coated with 2 parts by weight polyvinylidenedifluoride KYNAR 301F™) by mixing both materials in a Lödige mixer and coating the polymer on the surface of the ferrite in a rotary kiln at 200° C. under $N_2$-atmosphere to obtain a carrier with a medium size of 80 μm, a ratio $X_{75,3}/X_{25,3}$ of 1.32, a resistance of $1.1 * 10^{10}$ Ohm at a potential of 10V and a break-through voltage above 1,000V (both measured in a c-meter of Epping GmbM).

Examplee III
Preparation of a Developer I

11% by weight of the powder paint composition according to Example I and 89% by weight of the carrier according to Example II were mixed at room temperature intensively in a "Skandex" paint shaker for 5 minutes to obtain a developer. The charge distribution of the developer was measured in a q-meter of Epping GmbH showing a sharp charge over diameter (q/d)-distribution with a median of 2.2 μm, a standard deviation of 1.7 fC/10 μm and 5.2% oppositely charged particles.

ExampleS IV–VI
Preparation of Developers II, III and IV

A coated ferrite carrier having a median particle size of 53 μm and a ratio $X_{75,3}/X_{25,3}$ of 1.47 (both measured with the laser granulometer Cilas HR 850), a resistance of $3.2*10^{10}$ Ohm at a potential of 10V and a break-through voltage over 1000V (both measured in a c-meter of Epping GmbH) was mixed with a powder paint composition according to Example I in a weight ratio carrier/powder paint 86/14, 80/20 and 75/25 to obtain the developers II, III and IV.

The charge distribution of the developers II and III was measured in a q/d-meter of Epping GmbH showing a sharp q/d distribution with a median of –7.5 and –5 fC/10 μm, a standard deviation of 2.6 and 1.7 fC/10 μm and 0.12 and 0.01% oppositely charged particles, respectively.

Example VII
Coating on a Substrate

The developer according to Example III was filled in a magnetic brush unit mounted in a distance of 2.5 mm of a rotating metal drum available as the ld-tester (developer life time tester) from Epping GmbH. On the rotating drum an aluminum sheet of 0.1 mm thickness was mounted. The rotation speed of the drum (i.e. coating speed) was 100 mn/minute, the speed of the magnetic brush was 130 meter/minute in same direction as the drum. The doctor blade of the magnetic brush was adjusted to a distance of 1.5 mm to the magnetic roller. The magnetic pole was adjusted –10 degrees compared to the line between both rotating axes. The development potential of the drum against the developer roller was set to 1000V. The coated aluminum sheet, obtained after one development step, was then cured in an, oven at 200° C. to obtain a homogeneous powder coating with an average coating thickness of 25 μm and a tolerance of less than ±10%.

Example VIII–XI
Coating on a Substrate

Example VII was repeated and aluminum sheets were developed once or several times using the developers II–IV with the following results (in all cases the sheet was homogeneously coated):

TABLE I

| Developer | Coating Speed | No. of Developments | Thickness |
| --- | --- | --- | --- |
| II | 60 m/min | 3 | 18–22 μm |
| III | 60 m/min | 1 | 15–20 μm |
| IV | 60 m/min | 1 | 30–35 μm |
| IV | 130 m/min | 2 | 40–45 μm |

Example XII
Preparation of a Developer with Low break-through Voltage

A surface-oxidized, non-coated iron carrier of sponge shape having a median particle size of 154 μm and a ratio $X_{75,3}/X_{25,3}$ of 1.21 (both measured with the laser granulometer Cilas HR 850), a resistance of $1.3*10^{10}$ Ohm at a potential of 10V and a breakthrough voltage of 275V (both measured in the c-meter of Epping GmbH) was mixed with a powder paint composition according to Example I, where additionally the fine part of the particle size distribution was reduced by a further classifying step, in a ratio carrier/powder paint of about 97/3 to obtain developer V. It was not possible to increase the breakthrough voltage of the developer significantly by increasing the powder paint concentrations in the developer.

Example XIII
Dependence on Coating Speed and Brush Speed and Angle of Magnetic Field Example VII was repeated and aluminum sheets were developed once using developer V with the following results (in all cases the development voltage was –400

TABLE II

| Coating Speed | Brush Speed | Angle of Magnetic Field | Coating Thickness |
| --- | --- | --- | --- |
| 7.8 m/min | 45 m/min | –15° | 60–80 μm |
| 15 m/min | 60 m/min | –15° | 30–60 μm |

TABLE II-continued

| Coating Speed | Brush Speed | Angle of Magnetic Field | Coating Thickness |
|---|---|---|---|
| 7.8 m/min | 45 m/min | +5° | 10–15 µm |
| 7.8 m/min | 45 m/min | −15° | 30–40 µm |

Example XIV
Preparation of a Powder Paint Composition

A clear powder paint was produced analogous to Example I by using 300 parts by weight of a polyester resin (URALAC P5051™, supplied by DSM Resins), 300 parts by weight crosslinker (ARALDITE GB 7004™, supplied by Ciba Geigy), 3 parts by weight of flow control agent (BYK 361 supplied by Byk Chemie) and 2 parts of benzoin.

A powder paint was achieved with a median particle size of 10.8 µm and a ratio $X_{75,3}/X_{25,3}$ of 2.9.

Example XV
Preparation of a Developer Using a Clear Coat Powder Paint

Analogous to Example III a developer VI based on 155 parts by weight of the powder paint according to Example XIV and 845 parts by weight of carrier according to Example II was prepared.

Example XVI
Preparation of Thin Coatings

Analogous to example VII a sheet of aluminum was coated using developer VI (according to Example XV) at a substrate speed of 30 m/min. and a brush speed of 78 m/mn. with different development voltages. The results of the evaluation of the cured coating layers are listed below:

TABLE III

| dev. voltage | average coating layer thickness | result of evaluation |
|---|---|---|
| −1000 V | 7.5 µm | high gloss, closed film |
| −800 V | 3.5 µm | high gloss, closed film |

Example XVII
Heat Transfer on a Ferrous Substrate

The developer according to Example XV was filled in a magnetic brush unit according to Example VII and then developed onto a rotating drum, which was coated with a 5 mm thick conductive coating of silicone rubber, filled with conductive carbon black. The coating speed of the drum was 30 m/min. and the speed of the magnetic brush 78 mmin. All other parameters were equal to those in example VII. The developed powder paint layer was then completely transferred to an iron foil of about 0.5 mm thickness, which was pressed to the rotating drum by a metal roller heated to 200° C. and finally cured in an oven at 200° C. to obtain a homogeneous powder coating film with an average coating thickness of 8 µm.

Example XVIII
Electrostatic Transfer on a Ferrous Substrate

The developer according to Example XV was filled in a magnetic brush unit according to Example VII. The rotating drum was coated with a 5 mm thick conductive coating of silicone rubber filled with conductive carbon black and an additional isolating silicone rubber layer of 0.3 mm thickness (being defmed by a blade prior to drying). The coating speed of the drum was 30 m/min., the speed of the magnetic brush was 78 m/min. All other parameters were equal to Example VII. The powder coating layer was then transferred to an iron foil of about 0.5 mm thickness to a great extent, which was led to the rotating drum by a metal roller where a potential of −500V against the rotating drum was applied and finally cured in an oven at 200° C. to obtain a homogeneous coated film with an average coating thickness of about 7 µm.

Example XIX
Preparation of Powder Composition III

A powder paint composition was prepared by premixing 830 parts by weight of a polyester resin (URALAC XP3125 of DSM Resins), 170 parts by weight of a crosslinker (URALAC ZW 3307 of DSM Resins), 10 parts by weight of photoinitiator (IRGACURE 184™) and 6 parts by weight of flow agent (BYK 361 ™) in a Henschel batch mixer and next melt kneaded in a Buss-Ko-Kneader PLK 46.

The cooled extrudate was milled first in a hammer mill to a particle size <3mm and then fed into a target mill (NPK Labojet) obtaining a powder paint with a medium particle size of 10.8 µm and a $d_{75,3}/d_{25,3}$ ratio of 3.3.

Example XX
Preparation of Developer VII

16% by weight of the powder paint composition according to Example A and 84% by weight of the carrier according to Example II were mixed at room temperature intensively in a "Skandex" paint shaker for 5 minutes to obtain a developer. The charge distribution of the developer was measured in a q-meter of Epping GmbH showing a narrow charge over diameter (q/d)-distribution with a median of 2.2 fC/10 µm, a standard deviation of 1.7 fC/10 µm and 5.2% oppositely charged particles.

Example XXI
Coating on a Substrate

The developer according to Example XX was filled in a magnetic brush unit mounted in a distance of 2.5 mm of a rotating metal drum available as the Id-tester (developer life time tester) from Epping GmbH. On the rotating drum a cardboard substrate of 0.3 mm thickness preprinted with red offset printing ink was mounted. The rotation speed of the drum (i.e. coating speed) was 30 m/minute, and the speed of the magnetic brush was 78 meters/minute in the same direction as the drum. The doctor blade of the magnetic brush was adjusted to a distance of 1.5 mm to the magnetic roller. The magnetic pole was adjusted −10 degrees compared to the line between both rotating axes. The development of the potential of the drum against the developer roller was set to the following values (Table IV)

TABLE IV

| development voltage | average coating layer thickness | coating properties |
|---|---|---|
| −1000 V | 7.5 µm | high gloss (97%), closed film, oil- and tensid tight |
| −800 V | 3.5 µm | high gloss (94%), closed film, oil- and tensid tight |
| −600 V | 2.5 µm | medium gloss (75%) |
| −400 V | 1.5 µm | low gloss (38%) |
| −200 V | 1 µm | slight gloss (19%) |

After application on the cardboard substrate, the powder was heated at 70° C. by means of IR to obtain a good flowing film, followed by a UV radiation treatment (1000 mJ/cm$^2$). The result in the examples of the first two blocks of Table IV is a chemical resistant, hard and scratch resistant coating.

The gloss was measured with a Reflectometer supplied by Dr. Lange at 60° detection angle (according to DIN 67530).

Example XXII
Preparation of Powder Paint IV 99.5 parts by weight of the powder paint composition of Example XIX were mixed with 0.5 parts of weight of siliciumdioxide (AEROSIL R504™) in a Henschel batch mixer at maximum speed for 3 minutes to achieve a powder paint IV with excellent powder flow behavior.

Example XXIII
Preparation of Powder Paint V 99.5 parts by weight of the powder paint composition of Example XX were mixed with 0.5 parts of weight of siliciumdioxide (AEROSIL P25™) in a Henschel batch mixer at maximum speed for 3 minutes to achieve a powder paint V with excellent powder flow behavior.

Example XXIV
Preparation of Developer VIII 11 parts by weight of the powder paint composition IV according to Example XXII and 89 parts by weight of the carrier according to Example II were mixed in a "Skandex" paint shaker for 5 minutes to obtain a non-dusting developer VIII.

Example XXV
Preparation of Developer IX 15 parts by weight of the powder paint composition V according to Example XXIII and 85% by weight of the carrier according to Example II were mixed in a "Skandex" paint shaker for 5 minutes to obtain a non-dusting developer IX.

Example XXVI
Coating a Substrate

Analogous to Example XXI the developer VIII according to Example XXIV and the developer IX according to Example XXV were used to produce a chemical resistant, hard and scratch resistant coating on 0.3 mm thick cardboard preprinted with red offset ink (See Table V).

TABLE V

| | development voltage | average coating layer thickness | coating properties |
|---|---|---|---|
| developer VIII | −1000 V | 7.6 μm | medium gloss (55–60%), closed film, oil and tensid tight |
| developer IX | −1000 V | 9.7 μm | high gloss (80–85%), closed film, oil and tensid tight |

Example XXVII
Preparation of a Powder Paint VI

The cooled extrudate from Example XIX was milled first in a hammer mill to a particle size <3 mm and then fed into a fluidized bed mill (Condux CFS8), having a nozzle diameter of 4 mm. The material was milled with 6 bar overpressure at 3800 r.p.m. of the classifier wheel incorporated in the mill and after that fed into a separate classifier (Condux CGS 16) at 8000 r.p.m of the classifier wheel to reduce the fraction of fine particles below 5 μm in the powder obtaining a powder with a median particle size of 13.7 μm and a ration $X_{75.3}/X_{25.3}$ of 2.3. 99.5 parts by weight of this powder were mixed with 0.5 parts of weight of titaniumdioxide (AEROSIL P25™) in a Henschel batch mixer at maximum speed for 3 minutes to achieve powder paint VI with excellent powder flow behaviour.

Example XXVIII
Preparation of Developer X 10 parts by weight of the powder paint according to Example XXVII and 90% by weight of the carrier according to Example II were mixed in a "Skandex" paint shaker for 5 minutes to obtain a non-dusting developer X.

Example XXI
Coating a Substrate

Analogous to Example XXVI the developer X according to Example XXVIII was used to produce a 7.5 μm thick coating on a 90 g/m² paper preprinted in a commercially available dry toner based 4 colour copier/printer. The coating was proven to be hard and chemical, scratch and fingerprint resistant. The coated sheets were medium glossy (60–70%). The protection of prints against falsification were improved as any damage of the surface can easily be detected by the change of gloss of the surface.

What is claimed is:

1. A process for coating a substrate comprising:
    charging powder paint particles in the presence of carrier particles;
    feeding the charged powder paint particles with carrier particles to a transporter;
    transferring said charged powder paint particles from said transporter onto a transfer medium; and
    applying the powder paint particles from said transfer medium to said substrate to form a powder paint coating.
2. The process of claim 1, wherein said substrate includes metal.
3. The process of claim 1, wherein said substrate includes textile.
4. The process of claim 1, wherein said substrate includes plastic.
5. The process of claim 1, wherein said substrate includes cellulose.
6. The process of claim 1, wherein said substrate includes wood.
7. The process of claim 1, wherein said substrate includes cardboard.
8. The process of claim 1, wherein said substrate includes paper.
9. The process of claim 1, wherein said substrate includes a pre-treated substrate.
10. The process of claim 1, wherein said substrate includes hardboard, fiber board, particle board, chipboard, plywood, veneer, block board, and/or timber.
11. The process of claim 1, wherein said substrate includes aluminum.
12. The process of claim 1, wherein said substrate includes steel.
13. The process of claim 1, wherein said process is used for coil coating.
14. The process of claim 1, wherein said process is used for sheet coating.
15. The process of claim 1, wherein said process is used for foil coating.
16. The process of claim 1, wherein said process is used in the production of cans.
17. The process of claim 1, wherein said process is used in the application of varnishes.
18. The process of claim 1, wherein said transporter is a magnetic roller.

19. The process of claim 1, wherein said powder paint particles are charged by friction.

20. The process of claim 1, wherein said powder paint particles are charged by induction.

21. The process of claim 1, wherein said carrier particles comprise magnetic particles.

22. The process of claim 1, wherein said carrier particles comprise non-magnetic particles.

23. The process of claim 1, wherein carrier particles are magnetic carrier particles consisting of a core of iron, steel, nickel, magnetite, $\gamma\text{-Fe}_2\text{O}_3$, or ferrite; or non-magnetic metal, polymer or ceramic material.

24. The process of claim 1 wherein the powder paint particles have a $X_{50,3}$ below 80 μm and a $X_{95,3}$ below 120 μm.

25. The process of claim 1, wherein the powder paint particles have a $X_{50,3}$ below 30 μm and a $X_{95,3}$ below 50 μm.

26. The process of claim 1, wherein the carrier particles have a $X_{50,3}$ between 5 μm and 180 μm and a $X_{95,3}$ below 200 μm.

27. The process of claim 1, wherein said powder paint particles have a ratio $X_{75,3}:X_{25,3}$ below 3.

28. The process of claim 1, wherein said carrier particles have a ratio $X_{75,3}:X_{25,3}$ below 2.

29. The process of claim 1, wherein said powder paint coating is formed by curing said powder paint particles.

30. The process of claim 1, wherein said powder paint coating is formed by fusing said powder paint particles.

31. The process of claim 1, wherein said charged powder paint particles are transferred from said transporter onto said transfer medium by an electric field.

32. The process of claim 29, wherein said powder paint comprises a thermosetting binder system comprising a system selected from the group of:

(i) carboxylated polyester and triglycidylisocyanurate;

(ii) carboxylated polyester and epoxy resin;

(iii) carboxylated polyester and hydroxylamide group containing cross-linker;

(iv) carboxylated polyester and an aliphatic oxirane cross-linker;

(v) hydroxylated polyester resin and hexamethoxymethylmelamine;

(vi) hydroxylated polyester resin and an isocyanate group containing cross-linker;

(vii) an epoxy resin and phenolic resin cross-linker; and (viii) an epoxy resin and an amino resin cross-linker.

33. The process of claim 1, wherein the process uses a one-component developer.

34. The process of claim 1, wherein the process uses a two-component developer.

35. A process according to claim 1, wherein said powder paint particles comprise a radiation curable binder composition.

36. The process of claim 33, wherein said transporting means is a magnetic roller.

37. The process of claim 33, wherein said powder paint particles are charged by friction.

38. The process of claim 33, wherein said carrier particles are magnetic.

39. The process of claim 37, wherein said transporting means is a magnetic roller.

40. The process of claim 37, wherein said powder paint particles are charged by friction.

41. The process of claim 37, wherein said carrier particles are magnetic.

42. A process for coating a substrate with a powder paint composition, said process comprising:

charging powder paint particles by friction or induction in the presence of magnetic or non-magnetic carrier particles;

feeding the charged powder paint particles with carrier particles to transporting means;

transferring said charged powder paint particles from said transporting means onto a transfer medium by an electric field between said transporting means and said transfer medium; and applying the powder paint particles from said transfer medium to said substrate to form a powder paint coating, wherein said substrate includes metal, textile, plastic, or wood.

43. A process for coating a substrate with a powder paint composition, said process comprising:

charging powder paint particles by friction or induction in the presence of magnetic or non-magnetic carrier particles;

feeding the charged powder paint particles with carrier particles to transporting means;

transferring said charged powder paint particles from said transporting means onto a transfer medium by an electric field between said transporting means and said transfer medium; and applying the powder paint particles from said transfer medium to said substrate to form a powder paint coating, wherein said substrate includes board and/or paper.

* * * * *

UNITED STATES PATENT AND TRADEMARK OFFICE
CERTIFICATE OF CORRECTION

PATENT NO.    : 6,342,273 B1
DATED         : January 29, 2002
INVENTOR(S)   : Handels et al.

It is certified that error appears in the above-identified patent and that said Letters Patent is hereby corrected as shown below:

<u>Title page,</u>
Item [30], please insert:

-- Foreign Application Priority Data
    26 March 1996    [EP]  Europe…………96200819.9
    16 Nov. 1994    [EP]  Europe…………94203336.6 --

Item [63], delete "which" and insert therefor -- and this application --.

Signed and Sealed this

Seventeenth Day of September, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,342,273 B1
DATED         : January 29, 2002
INVENTOR(S)   : Handels et al.

It is certified that error appears in the above-identified patent and that said Letters Patent is hereby corrected as shown below:

<u>Title page,</u>
Item [30], please insert:

-- Foreign Application Priority Data
    26 March 1996    [EP]   Europe………...96200819.9
    16 Nov. 1994     [EP]   Europe………...94203336.6 --

Item [63], delete "which" and insert therefor -- and this application --.

Signed and Sealed this

First Day of October, 2002

*Attest:*

JAMES E. ROGAN
*Attesting Officer*    *Director of the United States Patent and Trademark Office*